US009669858B2

United States Patent
Washington et al.

(10) Patent No.: US 9,669,858 B2
(45) Date of Patent: Jun. 6, 2017

(54) REMOTE CONTROLLABLE SELF-PROPELLED STROLLER

(71) Applicants: Cathy Washington, Lakewood, NJ (US); L. C. Brown, Howell, NJ (US)

(72) Inventors: Cathy Washington, Lakewood, NJ (US); L. C. Brown, Howell, NJ (US)

( * ) Notice: Subject to any disclaimer, the term of this patent is extended or adjusted under 35 U.S.C. 154(b) by 0 days.

(21) Appl. No.: 14/334,628

(22) Filed: Jul. 17, 2014

(65) Prior Publication Data

US 2015/0144411 A1 May 28, 2015

Related U.S. Application Data

(60) Provisional application No. 61/847,337, filed on Jul. 17, 2013.

(51) Int. Cl.
*B62B 5/00* (2006.01)
*B62B 7/04* (2006.01)
*B62B 9/00* (2006.01)

(52) U.S. Cl.
CPC .......... *B62B 5/0076* (2013.01); *B62B 5/0033* (2013.01); *B62B 7/042* (2013.01); *B62B 9/005* (2013.01); *B62B 5/0043* (2013.01); *B62B 5/0046* (2013.01); *B62B 2205/003* (2013.01)

(58) Field of Classification Search
CPC .. B62D 1/24; B62D 1/28; B62D 15/00; B62B 5/0076; B62B 5/0033; B62B 5/0043; B62B 5/0046; B62B 7/042; B62B 9/005; B62B 2205/003
USPC ........................................................ 180/167
See application file for complete search history.

(56) References Cited

U.S. PATENT DOCUMENTS

| 5,873,425 | A |  | 2/1999 | Yang |
| 6,148,942 | A |  | 11/2000 | Mackert, Sr. |
| 6,561,536 | B2 |  | 5/2003 | Suzuki |
| 7,490,684 | B2 |  | 2/2009 | Seymour et al. |
| 7,798,886 | B1 | * | 9/2010 | Williamson ......... B62D 51/007 446/456 |
| 7,857,330 | B2 | * | 12/2010 | Chaudeurge ............ B62B 9/005 280/47.25 |
| 7,987,933 | B1 | * | 8/2011 | McClellan ............... B60K 1/00 180/65.1 |
| 8,033,348 | B1 | * | 10/2011 | Parkhe ...................... B62B 9/00 180/19.1 |

(Continued)

*Primary Examiner* — John Walters
(74) *Attorney, Agent, or Firm* — Global Intellectual Property Agency, LLC; Daniel Boudwin

(57) ABSTRACT

A motorized, self-propelled stroller that is controllable via a remote control unit. The motorized stroller has a motor, a power source, and a drive shaft that is operably connected to one of the stroller's axles to drive the rotation thereof. A wireless transceiver relays signals sent from the remote control unit to the motor to control the action of the motor. The motor is adapted to drive the rotation of the axle to which it is operably connected in both clockwise and counterclockwise directions, with varying speeds. Reflectors extend along the lateral sides of the stroller frame and lights are disposed on the front portion of the frame, making the stroller more visible during low-light conditions and thus safer to operate. The motorized stroller further includes a motorized assembly that is adapted to fold and unfold the stroller frame in response to input from the remote control unit.

8 Claims, 4 Drawing Sheets

(56) References Cited

U.S. PATENT DOCUMENTS

| | | | | |
|---|---|---|---|---|
| 8,195,366 B2* | 6/2012 | McCabe | ............... | B60L 3/02 |
| | | | | 172/2 |
| 8,499,898 B2* | 8/2013 | Thorne | ............... | B62B 7/002 |
| | | | | 188/2 F |
| 8,899,799 B1* | 12/2014 | Fairhurst | ............ | B62B 9/005 |
| | | | | 362/459 |
| 2005/0029030 A1* | 2/2005 | Ewert | ............... | B62D 1/24 |
| | | | | 180/167 |
| 2006/0191726 A1* | 8/2006 | Matte | ............... | A61G 5/042 |
| | | | | 180/65.1 |
| 2011/0010024 A1* | 1/2011 | Salisbury | ............ | G06F 3/014 |
| | | | | 701/2 |
| 2012/0155097 A1* | 6/2012 | Gross | ............... | B60Q 1/2696 |
| | | | | 362/459 |
| 2013/0008732 A1* | 1/2013 | Richter | ............... | A61G 5/04 |
| | | | | 180/167 |
| 2013/0162396 A1* | 6/2013 | Yang | ............... | B60L 15/20 |
| | | | | 340/5.81 |
| 2014/0226358 A1* | 8/2014 | Nielson | ............ | B62B 9/005 |
| | | | | 362/543 |
| 2014/0262575 A1* | 9/2014 | Richter | ............ | A61G 5/047 |
| | | | | 180/167 |

* cited by examiner

REMOTE CONTROLLABLE SELF-PROPELLED STROLLER

CROSS REFERENCE TO RELATED APPLICATION

This application claims the benefit of U.S. Provisional Application No. 61/847,337 filed on Jul. 17, 2013. The above identified patent application is herein incorporated by reference in its entirety to provide continuity of disclosure.

BACKGROUND OF THE INVENTION

Field of the Invention

The present invention relates to motorized, self-propelled strollers. More specifically, the present invention relates to motorized strollers that are operable via a remote control unit.

It can be extremely difficult to push a stroller while carrying a large number of items due to the weight and general cumbersome nature of items that many parents are transporting on a regular basis, such as food, extra clothes, and bags of accessories for the child. Furthermore, if an individual is going on extended walks with the child, taking the child on errands, or otherwise pushing the stroller a substantial distance or up steep inclines, then he or she can become fatigued due to the substantial weight cumulative weight of the stroller itself, the child resting in the stroller, and all of the articles stored on the stroller. If an individual is fatigued, then he or she may not be able to adequately perform his or her caregiver duties or perform other tasks and errands. Lastly, on some occasions an individual may simply be unable to physically push a stroller due to either the number of articles that he or she is carrying or the weight of the articles that he or she is carrying. Therefore, caregivers need a hands-free means for controlling the operation of a stroller.

Description of the Prior Art

Devices have been disclosed in the prior art that relate to motorized, self-propelled strollers. These include devices that have been patented and published in patent application publications. These devices generally relate to a stroller having a motor drive unit that is operably connected to a control unit disposed on the stroller. The following is a list of devices deemed most relevant to the present disclosure, which are herein described for the purposes of highlighting and differentiating the unique aspects of the present invention, and further highlighting the drawbacks existing in the prior art.

Various types of self-powered, motorized strollers are known in the prior art; however, they all utilize controls that are disposed directly on the stroller itself. This is a disadvantageous design because it nonetheless forces the user to directly interact with the stroller itself, which can be difficult when a user is carrying a large number of grocery bags or other such articles. When an individual is carrying a large number of items, it can be difficult to lift his or her arms to reach the stroller's controls to cause the stroller to begin moving forwardly. Furthermore, if the individual lags behind the self-propelled stroller due to the weight of the articles that the individual is carrying, then he or she loses the ability to control the movement of the stroller because the controls are disposed on the stroller itself. When a stroller carrying a child is moving without the ability of the user to control that movement, that child is in a substantial amount of danger. Despite these dangers, the advantages of self-propelled strollers cannot be denied because they assist users who ordinarily have to push heavy, cumbersome strollers substantial distances over the course of the day while running errands or performing other tasks and users who have to carry a large number of heavy items, such as groceries, while pushing a stroller. Therefore, there is a need in the prior art for a self-propelled stroller that is adapted to be controlled remotely.

Furthermore, many individuals have to use their strollers at night, either because they wish to walk or run for exercise with their child after they return home from work or because they need to run errands with their child at night. Conventional strollers completely lack any type of lights or reflective material, making them hazards in low-light conditions that potentially put the caretaker and the child resting in the stroller at risk. Therefore, there is a need in the prior art for strollers that comprise means for making the stroller more visible to motorists and other individuals in low-light conditions.

The present invention comprises a stroller, a power source, a motor having a drive shaft operably connected to one of the stroller's axles to provide rotational motion thereto, and a means for wirelessly controlling the speed and direction of the rotational motion imparted upon the stroller. The present invention further comprises lights disposed on the front portion of the stroller and lateral reflective strips, both of which are designed to make the stroller more visible in low-light conditions to motorists and other surrounding individuals. The present invention further comprises a plurality of USB ports or other such electrical ports, which allow individuals to charge a variety of electronic devices from the stroller's power source while running errands and performing other tasks. The present invention further comprises a secondary motor that is also wirelessly controllable and is operably connected to the frame of the stroller in order to transition the stroller between a first collapsed or compact configuration and a second position suitable for use.

The present remote controllable stroller substantially diverges in design elements from the prior art and consequently it is clear that there is a need in the art for an improvement to existing self-propelled strollers. In this regard the instant invention substantially fulfills these needs.

SUMMARY OF THE INVENTION

In view of the foregoing disadvantages inherent in the known types of self-propelled strollers now present in the prior art, the present invention provides a new remote controllable self-propelled stroller wherein the same can be utilized for providing convenience for the user when pushing a stroller when fatigued or when simultaneously carrying a cumbersome load of articles.

It is therefore an object of the present invention to provide a new and improved self-propelled stroller that has all of the advantages of the prior art and none of the disadvantages.

It is another object of the present invention to provide a self-propelled stroller that can be controlled remotely, without the need to physically interact with the stroller itself.

Another object of the present invention is to provide a self-propelled stroller that can automatically fold and unfold.

Another object of the present invention is to provide a self-propelled stroller that has increased visibility in low-light situations, thereby providing the caretaker and the child resting within the stroller with improved safety as compared to conventional strollers.

Yet another object of the present invention is to provide a self-propelled stroller that comprises a means for recharging other electronic devices.

Yet another object of the present invention is to provide a self-propelled stroller that utilizes a rechargeable power source.

Still yet another object of the present invention is to provide a self-propelled stroller that comprises a means for remotely controlling a wide range of the stroller's functions, including the speed and direction of the movement of the stroller and the ability of the stroller to collapse into a folded configuration.

Still yet another object of the present invention is to provide a self-propelled stroller that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
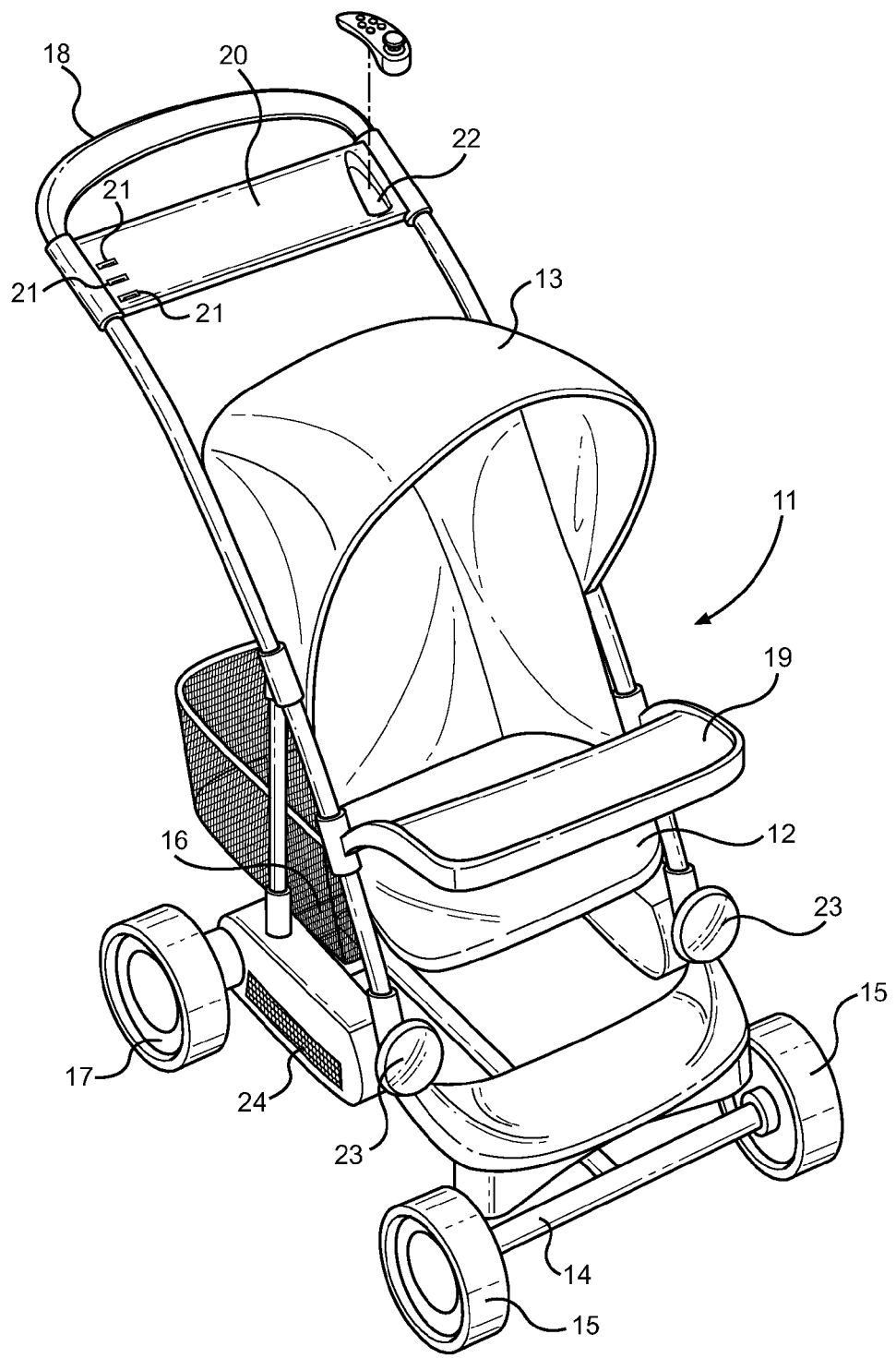
FIG. 1 shows a perspective view of the present invention.

Reference is made herein to the attached drawings. Like reference numerals are used throughout the drawings to depict like or similar elements of the remote control operable stroller. For the purposes of presenting a brief and clear description of the present invention, the preferred embodiment will be discussed as used for wirelessly controlling the movement of a motorized stroller via a remote control unit having a plurality of buttons adapted to provide a variety of commands to the stroller's motor unit in order to control the speed, direction of movement, and other activity of the motorized stroller. The figures are intended for representative purposes only and should not be considered to be limiting in any respect.

Referring now to FIG. 1, there is shown a perspective view of the present invention. The present invention is a self-propelled stroller that is adapted to be controlled remotely, i.e. without the need for the user to physically interact with the stroller itself, and that has improved visibility in low-light conditions. The present invention comprises a stroller frame 11, a seat 12 and a cover 13 thereover, a front axle 15 having a plurality of front wheels 15 disposed thereon, a rear axle 16 having a plurality of rear wheels 17 disposed thereon, a first tray 19 positioned adjacently to the seat 12 for use by a child, a handle 18, a second tray 20 positioned adjacently to the handle 18, and a remote control unit 71 adapted to control the operation of the stroller. The front wheels 15 are pivotally attached to the front axle 14, thereby allowing the user to change the direction of movement of the present invention. The stroller frame 11 comprises a series of rigid, elongated members adapted to support the seat 12, the cover 13 extending therefrom and creating a retractable canopy over the seat 12, and the handle 18 extending from the top portion of the frame 11. The axles 14, 16 are rotatably attached to the frame 11, thereby allowing the drive assembly 41 to drive the movement of the stroller by imparting rotation upon the axle to which to drive assembly is affixed, which in the depicted embodiment is the rear axle 16. The rotation of the rear axle 16 then causes the rear wheels 17 to rotate, thereby causing the stroller to move in either a forward or a reverse direction depending upon whether a counterclockwise or clockwise direction of rotation is imparted upon the rear axle 16.

Figure 2A:
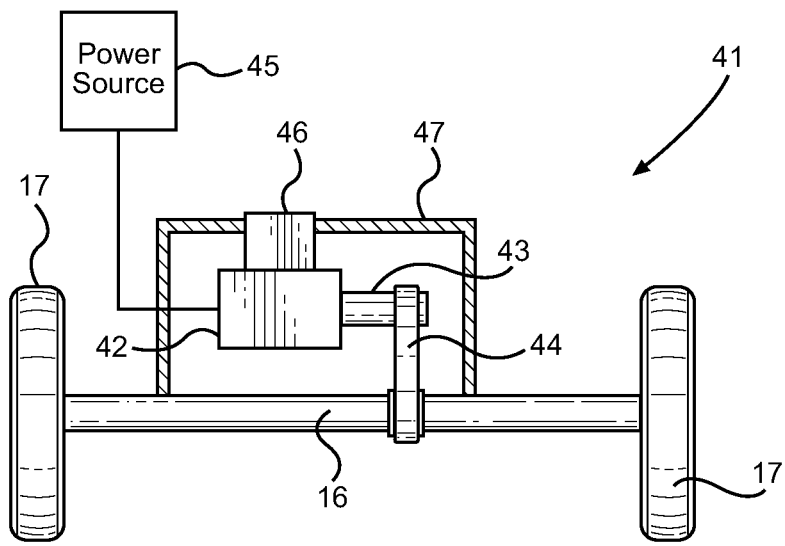
FIG. 2A shows a cutaway view of the drive assembly of a first embodiment of the present invention.
Figure 2B:
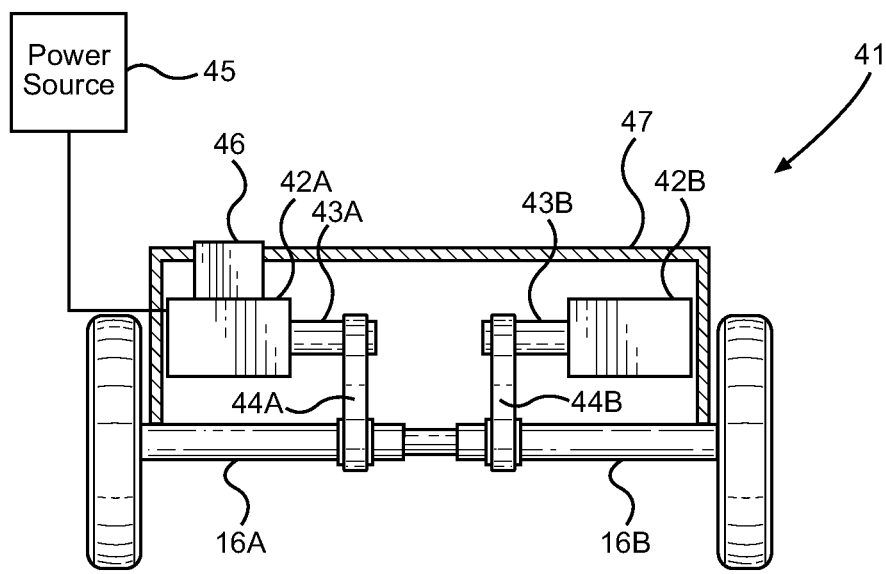
FIG. 2B shows a cutaway view of the drive assembly of a second embodiment of the present invention.

Referring now to FIGS. 2A and 2B, there are shown cutaway views of the drive assemblies of a first and a second embodiment of the present invention. The drive assembly 41 comprises a housing 47, a motor 42, a drive shaft 43 extending therefrom, a drive train 44 operably connecting the drive shaft 43 to the rear axle 16, a power source 45, and a wireless transceiver 46 for wirelessly receiving command signals from the remote control unit 71 and relaying said commands to the motor 42 in order to control the operation of the motor 42. The housing 47 is constructed from a lightweight, durable material that are adapted to protect the motor 42 and various other components from damage due to physical impacts or exposure to weather conditions, dirt, and the like. The motor 42 comprises any motor that is adapted to impart rotational movement onto a drive shaft 43 with sufficient torque to propel a stroller. The motor 42 is adapted to provide either a counterclockwise and clockwise rotation to the rear axle 16, thereby controlling whether the stroller moves in a forward or a reverse direction.

In an alternative embodiment of the present invention, the rear wheels 17 are independently movable by the drive assembly 41, thereby providing the user with a means to control the direction of lateral movement of the stroller, in addition to being able to control the movement of the stroller in a forward and reverse manner, as described herein. In this alternative embodiment, as shown in FIG. 2B, the drive assembly 41 comprises two separate motors 42A, 42B operably connected to two separate lateral members of the rear axle 16A, 16B, wherein the separate lateral rear axle members 16A, 16B are independently movable with respect to each other by the motor 42A, 42B operably connected thereto. Each of the motors 42A, 42B has its own drive shaft 43A, 43B and drive train 44A, 44B in mechanical communication with its respective lateral rear axle member 16A, 16B. The drive assembly 41 is therefore adapted to selectively control the direction of rotation of, and the amount of torque applied to, the separate lateral rear axle members 16A, 16B. The drive assembly 41 of a second embodiment of the present invention is adapted to move the stroller in a lateral direction, as well as a longitudinal direction as described herein, by changing the degree of torque applied to the independently movable lateral rear axle portions 16A, 16B.

The power supply 41 provides power to the motor 42 or motors 42A, 42B and the wireless transceiver 46. The power supply 41 comprises rechargeable batteries, solar cells, or any other such reusable power source. For embodiments of the present invention utilizing a rechargeable battery, the power supply 41 may further comprise a retractable power cord that can be plugged into an electrical outlet in order to recharge the battery. In other embodiments of the present invention, the power supply 41 is removable from the stroller so that it can be recharged at a location remote from the stroller itself, whereafter it can be reconnected to supply power to the various electrical components of the present invention.

The drive train 44 mechanically communicates the rotational force generated by the drive train 43 connected thereto to the rear axle 16 or the respective lateral rear axle member 16A, 16B to which it is affixed. The drive train 44 comprises a chain and sprocket assembly, a gear train, or any other such means of communicating rotational force to an axle that is operable in both a clockwise and counterclockwise motion. In a preferred embodiment of the present invention, the mechanical interaction between the drive train 44, or the drive assembly 41 as a whole, and the rear axle 16 is such that the rear axle 16 is able to rotate freely when the drive train 44 is not actively applying force thereto, allowing users to manually push the stroller if they so desire without resistance from the drive assembly 41.

The wireless transceiver 46 is adapted to receive signals from the remote control unit 71 via any means of wireless connection known in the prior art, such as a Bluetooth connection, and translate those wireless signals into commands that are then relayed to the motor 42 or motors 42A, 42B. Those commands include the degree of torque applied to the motor 42 or motors 42A, 42B, which dictates the speed at which the stroller moves, and the direction of rotation of the motor 42 or motors 42A, 42B. In embodiments of the present invention utilizing multiple motors 42A, 42B the differential torque, i.e. the difference in the magnitude of the torque generated by the motors 42A, 42B, generated thereby also controls the lateral direction in which the stroller is moving, as described herein. The wireless transceiver 46 determines the degree of differential torque to apply across the motors 42A, 42B based upon the directional signal received from the remote control unit 71 and then sends a signal to each of the motors 42A, 42B in order to generate the calculated appropriate level of differential torque.

Figure 3:
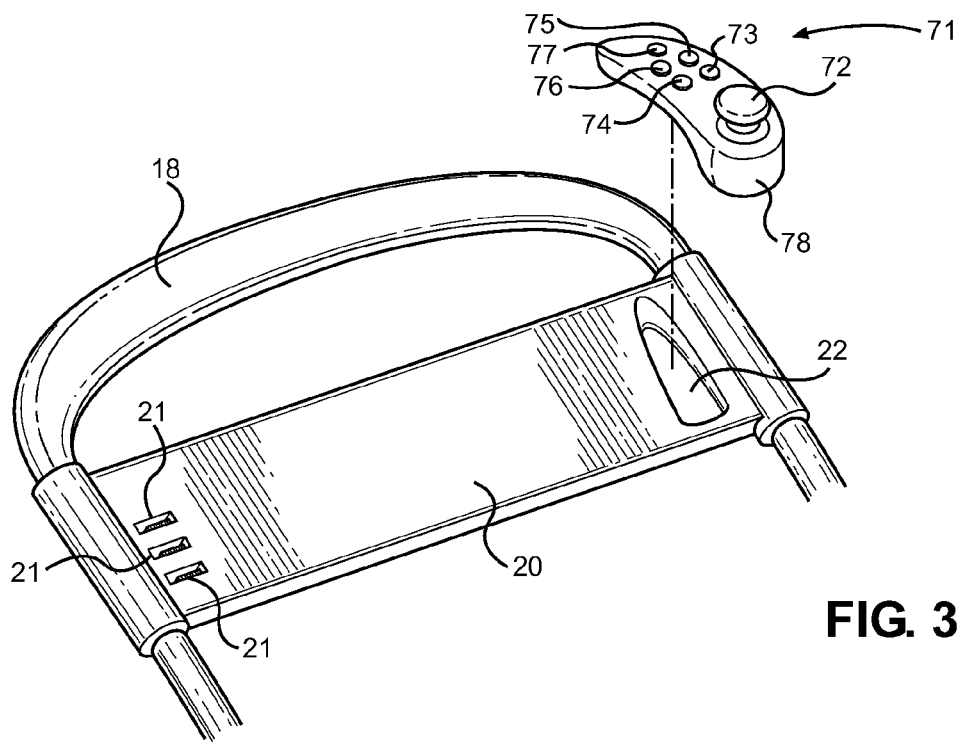
FIG. 3 shows a perspective view of the second tray portion of the present invention with the remote control unit.

Referring now to FIG. 3, there is shown a perspective view of the second tray portion of the present invention with the remote control unit. The second tray 20 comprises a substantially planar surface positioned adjacently to the handle 18 on the stroller frame 11. The second tray 20 further comprises a plurality of USB ports 21, or other such electrical ports into which electronic devices may be plugged to be recharged, and a remote control dock 22. The USB ports 21 are electrically connected to the power source 45 and are adapted to draw power therefrom to power any electronic device attached thereto. The remote control dock 22 comprises a recessed slot substantially conforming to the size and the shape of the remote control unit 71. The remote control dock 22 is adapted to accept the remote control unit 71 therein and hold the remote control unit 71 securely in place during transport. The remote control dock 22 further comprises clips or other such connectors that are adapted for removably holding the remote control unit 71 in place. In an alternative embodiment of the present invention, the remote control dock 22 comprises an inductive charging means that is connected to the power source 45 for wirelessly recharging the remote control unit 71 when not in use.

The remote control unit 71 comprises a housing 78, a wireless transceiver that is connectable to the drive assembly wireless transceiver 46, a power source, and an input means, such as buttons. As depicted, the remote control unit 71 has a plurality of buttons thereon and a directional pad; however, alternative embodiments of the remote control unit 71 comprise compact, key fob-like devices that are more easily held and kept on one's person. The depicted embodiment of the remote control unit 71 comprises a directional control 72, a power button 73 for the system as a whole, a speed control 74 for incrementing or decrementing the movement speed of the stroller, a fold/unfold button 75, a brakes power button 76, and a lights power button 77. The remote control unit 71 is adapted to wirelessly transmit these commands to the wireless transceiver 46 or other appropriate electrical component of the present invention. The remote control unit 71 thereby provides users with a means for wirelessly and remotely controlling the functionality of the present invention.

Figure 4:
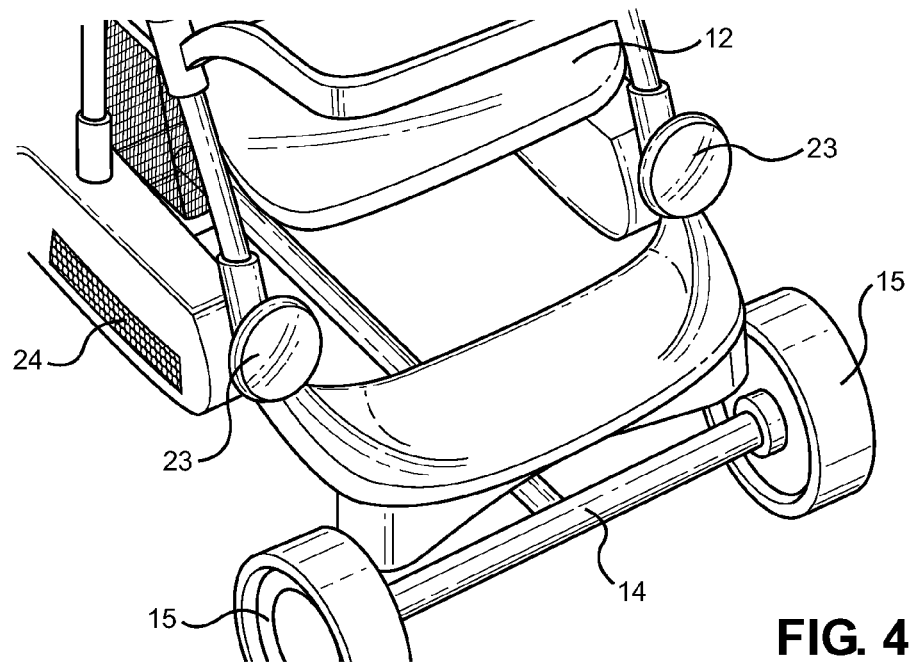
FIG. 4 shows a side view of the present invention.

Referring now to FIG. 4, there is shown a side view of the present invention. The present stroller further comprises lights 23 and reflectors 24 integrally affixed to the stroller frame 11. The lights 23 are preferably forward-facing lights, such as LED lights, that are electrically connected to the power source 45. The reflectors 24 comprise elongated strips of retroreflective material extending along the lateral sides of the stroller frame 11. The lights 23 and the reflectors 24 improve the overall safety of the present stroller by increasing its visibility in low-light conditions to passing motorists and other individuals in the surrounding area. Furthermore, the wheels 15, 17 comprising treading so that the present invention is able to travel more efficiently over sand, mud, snow, and other such terrain.

Figure 5:
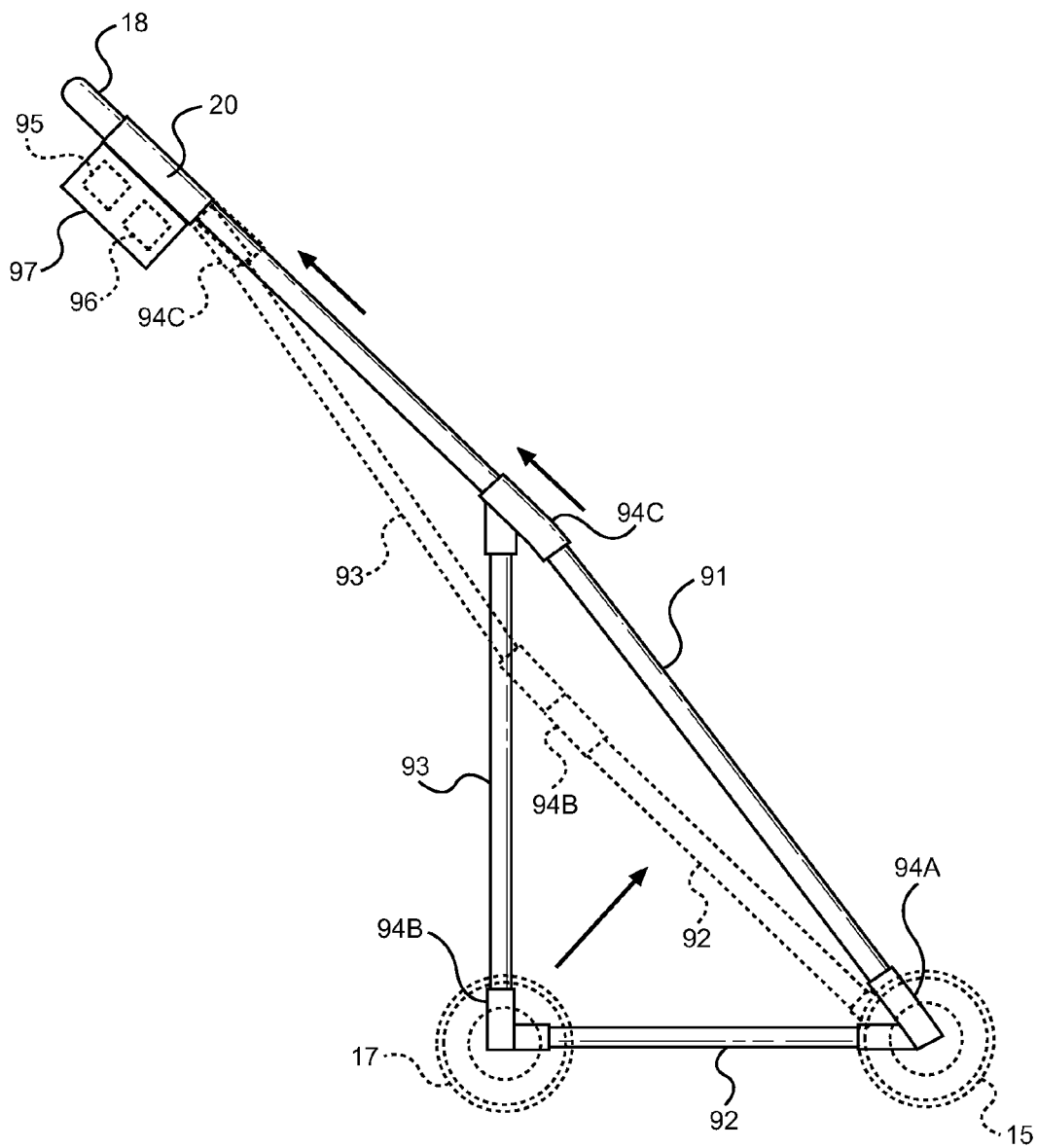
FIG. 5 shows a side view of the frame portion of the present invention transitioning between a first configuration and a second configuration.

Referring now to FIG. 5, there is shown a side view of the frame portion of the present invention transitioning between a first configuration and a second configuration. The present invention is further adapted to automatically transition between a first position, suitable for use as a stroller, and a second, collapsed configuration in response to actuation from a user, via either an input means disposed on the stroller frame 11 or via input from the remote control unit 71. In the depicted embodiment of the present invention, the stroller frame 11 comprises a first frame member 91, a second frame member 92, and a third frame member 93. The first and second frame members 91, 92 are hingedly connected by a joint 94A; the second and third frame members 92, 93 are hingedly connected by a second joint 94B; and the first and third frame members 91, 93 are slidably and hingedly connected by a third joint 94C. When transitioning from the first configuration to the second, collapsed configuration, the third joint 94C slides upwardly on the first member 91, pulling the second and third members 92, 93 into a substantially flush position against the first member 91. The third joint 94C is pulled upwardly via a telescoping member disposed within the interior of the top portion of the first member 91 and that is connected thereto. In the depicted embodiment of the present invention, the telescoping member is retracted via a second, supplementary motor 95 positioned adjacently to the handle 18 on the stroller frame 11, which is contained within a supplementary housing 97. In this depicted embodiment of the present invention, the supplementary housing 97 further comprises a supplementary wireless receiver 96 that is adapted to receive the fold/unfold commands from the remote control unit 71 and thereafter activate the supplementary motor 95. In an alternative embodiment of the present invention, the first wireless transceiver 46 sends the fold/unfold command to the supplementary motor 95 when it is received, rather than utilizing a supplementary wireless receiver 96.

The depicted embodiment of the mechanism for transitioning the present invention between a first, unfolded configuration and a second, folded or compact configuration is intended merely to be exemplary. No claim is made as to a specific means for folding and unfolding the present stroller, except insofar that it is operable via an automatic motorized system. It is submitted that such motorized folding and unfolding mechanisms are known in the prior art.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A motorized, remote controlled stroller, comprising:
   a stroller frame comprising a first axle, a plurality of first wheels mounted on said first axle, a second axle, and a plurality of second wheels mounted on said second axle;
   the first axle comprising a first section and a second section;
   a drive assembly comprising:
      a first motor mounted to the stroller frame, the first motor comprising a drive shaft operably connected to the first axle via a drive train and configured to rotatably drive the first section;
      a second motor mounted to the stroller frame, the second motor comprising a drive shaft operably connected to the first axle via a drive train and configured to rotatably drive the second section;
      first motor and the second motor configured to independently apply an amount of torque to the first section and second section, respectively;
   a power source mounted to said stroller frame and electrically connected to said at least one motor;
   a remote control unit having a housing with one or more buttons thereon, wherein said remote control unit is adapted to transmit input commands, said remote control unit being removably securable to said stroller frame;
   a wireless transceiver operably connected to the motor, the wireless transceiver adapted to receive said input commands from said remote control unit and control a speed and a direction of rotation imparted upon said first axle by the motor.

2. The device of claim 1, further comprising a tray having at least one USB port and a remote control unit dock.

3. The device of claim 2, wherein said remote control dock comprises an inductive charger.

4. The device of claim 1, wherein said remote control unit is adapted to control a direction of movement of said stroller.

5. The device of claim 1, wherein the stroller frame comprises a plurality of frame sections pivotally affixed to one another such that the frame is movable between an assembled configuration and a collapsed configuration.

6. The device of claim 1, further comprising at least one light disposed on said stroller frame, wherein said at least one light is electrically connected to said power source.

7. The device of claim 1, further comprising retroreflective strips disposed on said stroller frame.

8. The device of claim 1, further comprising one or more USB ports disposed on said stroller frame, wherein said USB ports are electrically connected to said power source and are adapted for connection to a charging cable of a mobile electronic device so as to charge a battery of the mobile electronic device.

* * * * *